Feb. 18, 1930.  T. S. S. WAGNER  1,747,746
MACHINE FOR DISPLAYING ADVERTISING
Filed Feb. 6, 1929  8 Sheets-Sheet 1

Fig.1.

Inventor
Thomas S. S. Wagner
by Hazard and Miller
Attorneys.

Feb. 18, 1930. T. S. S. WAGNER 1,747,746
MACHINE FOR DISPLAYING ADVERTISING
Filed Feb. 6, 1929  8 Sheets-Sheet 5

Inventor
Thomas S. S. Wagner
by Hazard and Miller
Attorneys

Feb. 18, 1930.　　T. S. S. WAGNER　　1,747,746
MACHINE FOR DISPLAYING ADVERTISING
Filed Feb. 6, 1929　　8 Sheets-Sheet 6

Inventor:
Thomas S. S. Wagner
by Hazard and Miller
Attorneys.

Feb. 18, 1930. T. S. S. WAGNER 1,747,746
MACHINE FOR DISPLAYING ADVERTISING
Filed Feb. 6, 1929 8 Sheets-Sheet 7

Inventor
Thomas S.S. Wagner
by Hazard and Miller
Attorneys.

Patented Feb. 18, 1930

1,747,746

UNITED STATES PATENT OFFICE

THOMAS S. S. WAGNER, OF GARDENA, CALIFORNIA, ASSIGNOR OF THIRTY-THREE AND ONE-THIRD PER CENT TO FRED WIRTZ, OF LOS ANGELES, CALIFORNIA, AND THIRTY-THREE AND ONE-THIRD PER CENT TO JOHANNES I. JOHANSEN, OF HUNTINGTON PARK, CALIFORNIA

MACHINE FOR DISPLAYING ADVERTISING

Application filed February 6, 1929. Serial No. 337,830.

My invention is a machine for displaying advertising in which cards or the like are moved in an arc of a circle from one position to another position.

An object of my invention is the construction of a machine for moving advertising cards or the like by an arcuate movement from one position of display showing one side of the cards to another position of display showing the back or opposite sides of the cards. In this connection the cards are moved one by one in one direction and then the pack or stack of cards is moved back to the initial position as a group and the operation is repeated.

In more detail, an object of my invention is in utilizing a plurality of rotatably mounted arms, each of these arms being adapted to support an advertising card or the like. These arms are arranged to form a stack or pack at one side of the machine and each arm is moved in succession in an arcuate path to the other side of the machine where it remains at rest. By this procedure the front of the card is exhibited on the starting side and the reverse or back of the card on the finishing side of movement of the machine. In this connection another detailed object of my invention is after all the arms with their cards have been moved from the initial to the side of finished movement of the machine, the stack or pack of cards as a body are returned to their original position.

A further detailed object of my invention is the employment of a rotatable shifting or abutment structure which engages each of the arms in succession and moves these arms through substantially one half of a circle and returns to its original position. In connection with the return movement, an object of my invention is to raise the abutment or moving structure so that it may clear the arms already in position and engage the outermost arm to shift it from the initial to the final position.

In connection with the return movement of the pack of arms, a detailed object of my invention is utilizing a partly rotatable beam with which the pack becomes locked and this beam is moved after the last arm has been shifted from the initial to the final position and becomes latched to the pack. Then a second rotatable beam engages the beam holding the pack and shifts these to their original position. When in such position the two moving beams become unlatched one from the other and the beam latched to the pack of arms is unlatched therefrom.

In constructing my invention I utilize a suitable framework and have a central shaft with a semi-circular track concentric with the central shaft. A plurality of arms preferably made of thin sheet metal are stacked on the central pivotal shaft and each of these arms at its outer end has a device for suspending an advertising card or the like. These arms are preferably stacked so that the web of the arm is vertical adjacent the outer ends and has a quarter turn so that the inner or hub portion of the arms is in a horizontal plane. The moving or abutment device for shifting the arms one by one is connected to a pinion which has vertical sliding movement on the central pivotal shaft. This pinion is driven by a reciprocating rack, the motion of the rack being derived from a cam. The cam is designed to reciprocate the rack in both directions so as to move one of the arms from one side of the machine to the other and return the moving or abutment device to its original position. The cam then has a pause for a predetermined time so that people can read the advertisement. Cooperating with the abutment device there is a constantly driven cam which is connected by a lever to raise and lower the pinion to which the abutment device is connected so that this may slip over the stack of arms and engage the uppermost arm on the horizontal portion adjacent the hub. By this arrangement each arm is engaged in succession before moving. The arms may bear on the semi-circular track while being shifted and are thus supported in their initial and final position.

Rotatably mounted on the central or pivotal shaft there is a beam located below the pack of arms and having a latch. This beam after all the arms have been moved is engaged by the moving abutment device and shifted from the initial to the final position of the pack of arms and there becomes locked to such pack. A shifting beam is connected to the central or pivotal shaft and rotates therewith. This shifting beam is timed to engage the latching beam which holds the pack of arms and shift this beam with the pack from the final to the initial position. This shifting beam moves slightly faster in the return movement than does the abutment or arm pushing device and arrives at its initial position before the arm pushing device is in position to start another cycle of operations. The central shaft has a reverse movement. The whole device may be driven by an electric motor through suitable gearing and suitable cams.

My invention is illustrated in the accompanying drawings, in which.

My invention is illustrated as being mounted on a suitable supporting structure, such as a table 11 and at the front thereof has a vertical shaft 12. This shaft is shown as having a bearing in a socket 13 in a table and as having an upper bearing 14 mounted in a top bar 15 which bar is supported by side posts 16. A semi-circular track 17 of T angle shape is connected between the posts 16 and forms a support for the arms carrying the cards.

The arms for carrying the cards are designated generally by the numeral 18 and the characteristic feature of these arms is that the central or what may be termed the hub portion 19 through which the vertical shaft 12 extends, occupies a horizontal plane. The arms are then given a quarter turn twist 20 and have an outer extension portion 21 in a vertical plane. The arms are indicated as having a triangular carrying blade 22 which is provided with hooks 23 and from these hooks depend the advertising cards 24.

Figure 2:
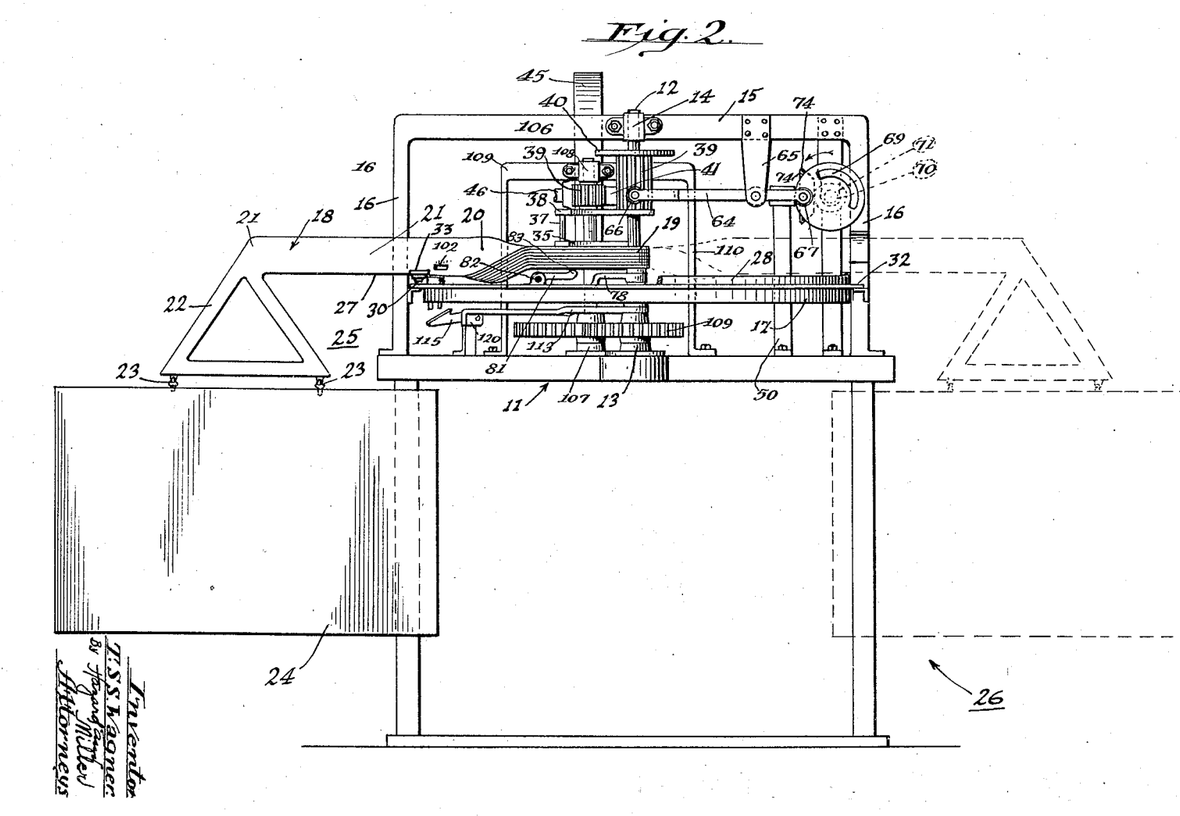
Fig. 2 is a front elevation taken in the direction of the arrow 2 of Fig. 1.

In Fig. 2 the arms with the cards are all shown as grouped on one side of the machine which side may be designated as the initial position side by the numeral 25 and the cards are moved to the opposite side which may be designated the final position side 26; an arm and card being shown dotted in Fig. 2 in this position. Each of the arms is loosely mounted on the vertical shaft so that it may have a partial rotation independent of the rotation of such shaft. The lower edge 27 of the vertical section of each of the blades except the rearwardmost blade of the pack considered on the initial side, has a rubbing contact on the upper flange 28 of the semi-circular track 17. The rearwardmost blade is provided with a bracket 29 which at the bottom has a ball bearing 30.

Figure 13:
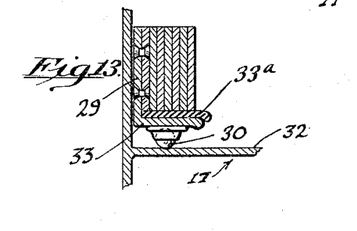
Fig 13 is a detail vertical section on the line 13—13 of Fig. 9 in the direction of the arrow.

On the initial side this ball drops into a small socket 31 (note Fig. 6) and such ball rolls on the fin 32 of the semi-circular track 17. Extending forwardly from the bracket 29 there is a supporting plate 33 on which the pack of blades are adapted to rest when arranged in a pack at the initial position and also in a pack at the final position. This plate has a slightly downwardly depressed end to allow the blades to lift slightly when the blade last to be moved from the initial side engages the blades already moved to the final side of the turn. (Note Fig. 13).

Figure 1:
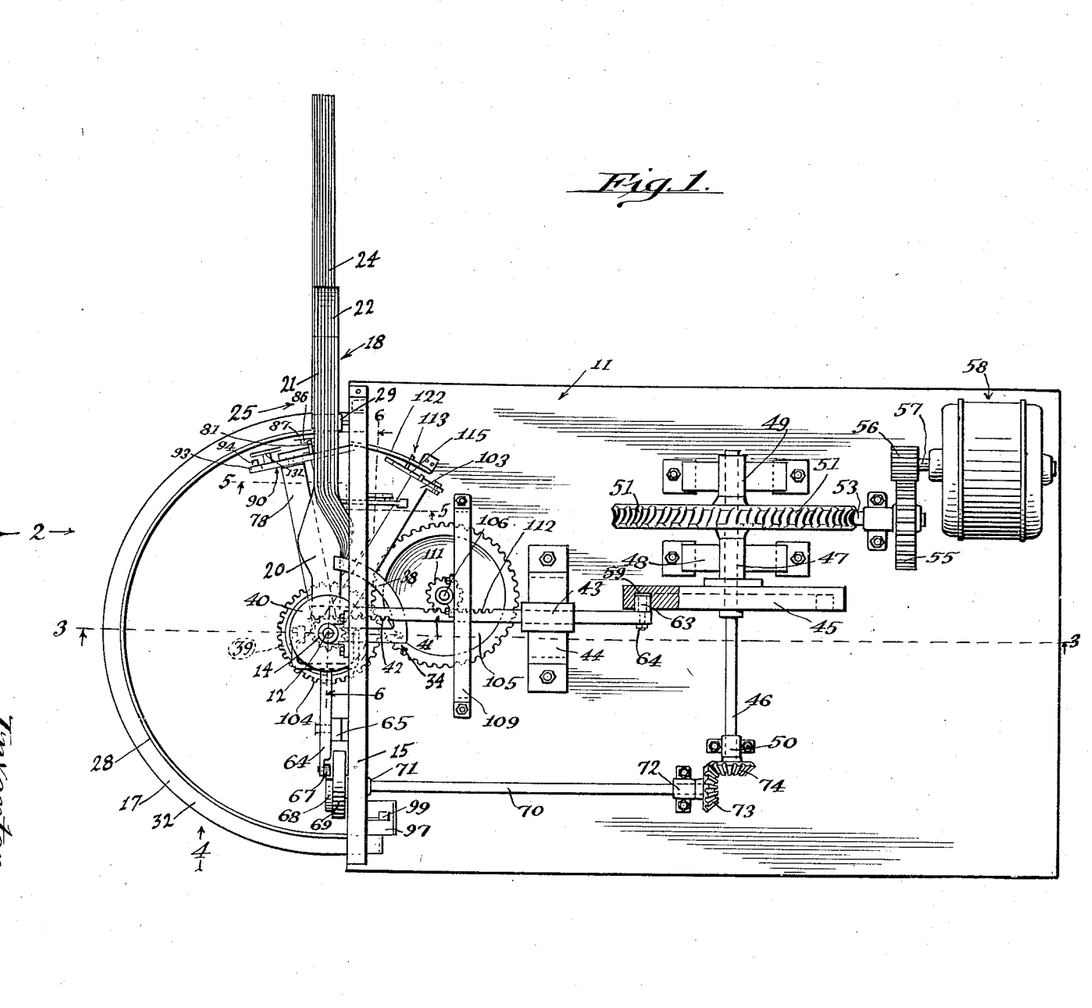
Figure 1 is a plan of my invention showing a suitable mounting for the moving mechanism.
Figure 3:
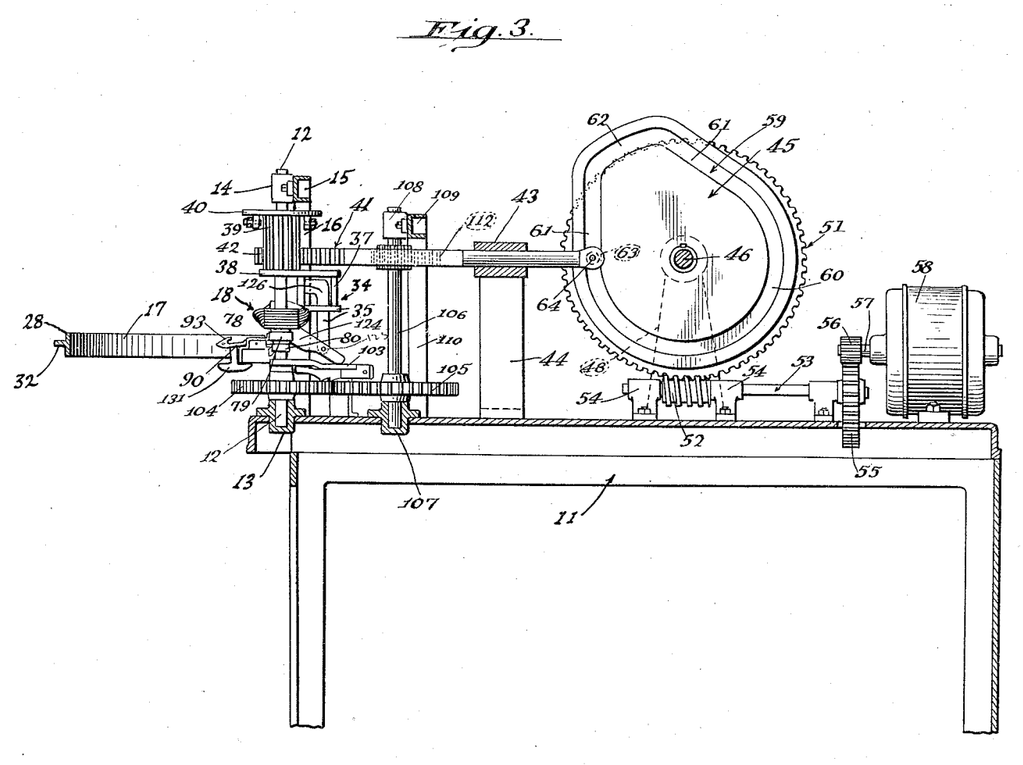
Fig. 3 is a vertical longitudinal section taken on the line 3—3 of Fig. 1 in the direction of the arrows.
Figure 4:
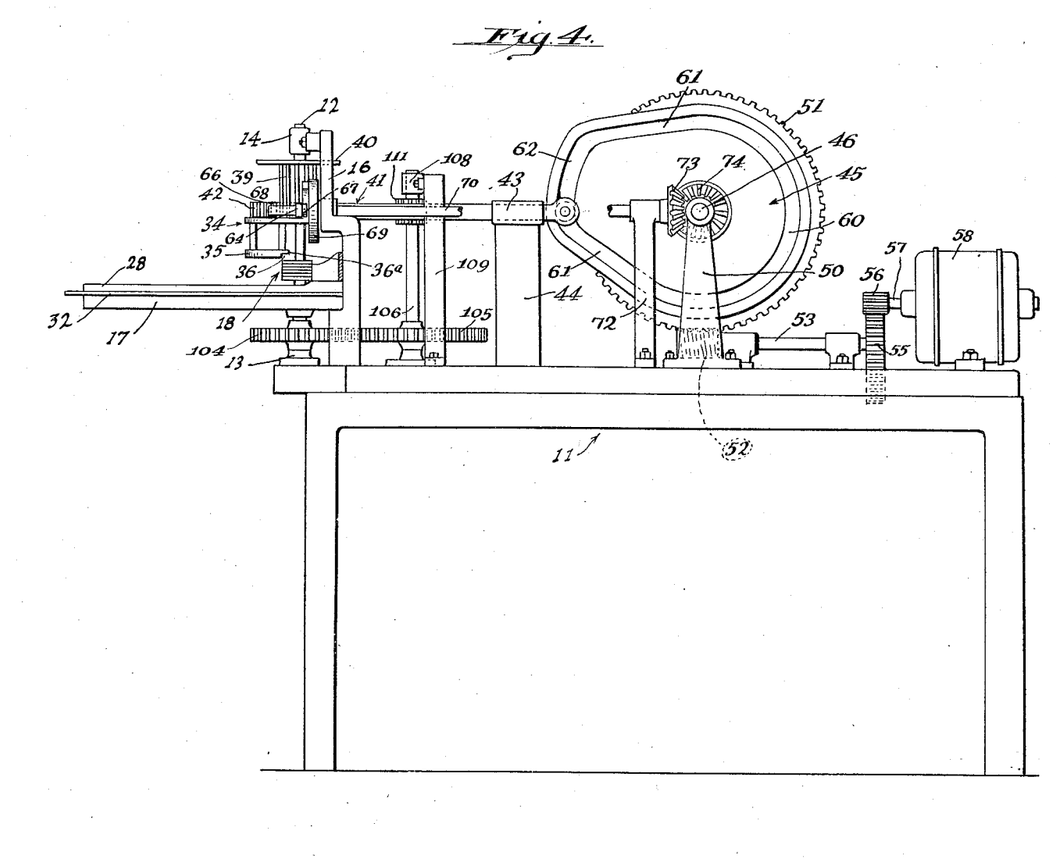
Fig. 4 is a side elevation taken in the direction of the arrow 4 of Fig. 1, showing one of the arms moved into the final position and the cam controlling the rack shown with the rack in its outermost position.
Figure 6:
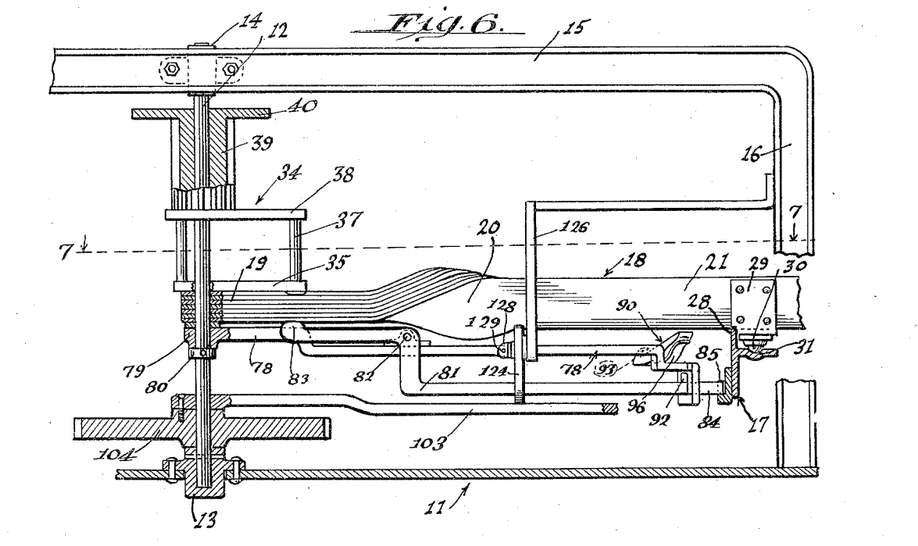
Fig. 6 is an enlarged detail taken on the line 6—6 of Fig. 1 in the direction of the arrows, showing the stack of arms connected to the latching beam.

The mechanism for turning each blade in succession from the initial to the final side of the machine, comprises a pusher device designated generally by the numeral 34 (note Fig. 6). This pusher device has a curved bottom bar 35 having a slight notch 36 in its forward leading edge on the underside. The bar 35 is connected by studs 37 to an upper arcuate bar 38 and this latter is fixedly attached to a pinion 39 which is rotatably mounted on the vertical shaft 12. The pinion has a wide upper flange 40 for the purpose hereunder detailed. A rack bar 41 (Figs. 1, 3 and 4) has a rack 42 adjacent its forward end and meshes with the pinion 39. This rack bar is guided in a bearing 43 mounted on the post 44 extending upwardly from the table 11 to allow sliding movement of the rack bar.

The drive for the rack bar comprises a cam wheel 45 mounted on a cam shaft 46. This cam shaft has a bearing 47 in a bracket 48 extending upwardly from the table 11 and also in a bracket 49 extending upwardly from the table. There is also a third bracket 50 forming a journal for one end of the shaft. This shaft has a worm wheel 51 which meshes with the worm 52 on the worm shaft 53; this worm being mounted in suitable bearing brackets 54. The shaft has a gear 55 thereon meshing with the pinion 56 of the shaft 57 driven by the electric motor designated generally at 58; the motor preferably being mounted on the table 11.

The cam wheel 45 has a cam groove 59 in which a rest portion 60 is concentric to the shaft 46 and advancing and retrieving portions 61 to convey motion to the rack with a reverse curve 62 at the junction end of the advancing and receiving portions. The rack bar 41 has a roller 63 mounted on a stud 64' engaging in the cam groove. Therefore as the cam wheel continually rotates, the rack bar advances, then reverses its motion and recedes and comes to rest in the receded position while the roller runs in the rest section 60 of the groove.

In the advancing motion of the rack bar, the pinion 39 is rotated and carries the pusher 34 with it. This pusher and the pinion rest through their own weight on the horizontal section of the uppermost arm of the pack of arms so that the notch 36 engages the uppermost arm and carries it from the initial position 25 completely around the semi-circular track to the final position 26. The receiving motion of the rack reverses the rotation of the pinion and returns the pusher to its original position and then there is a pause as above mentioned.

Figure 11:
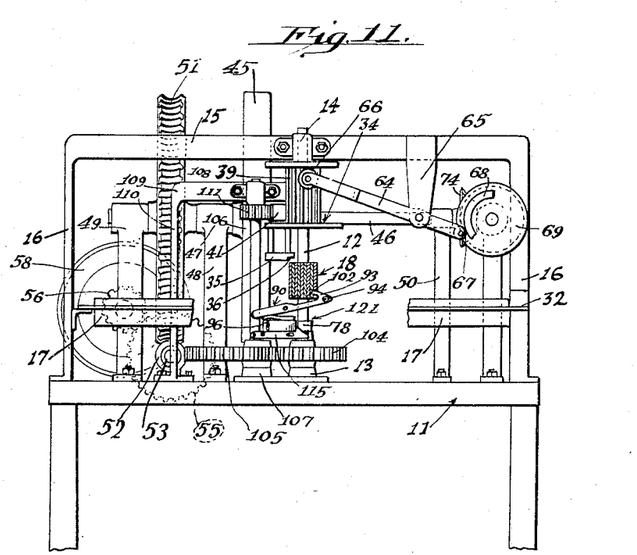
Fig. 11 is an elevation similar to Fig. 2, showing the pack of arms in an end view and being moved from the final to the initial position.

As the pusher returns from the final to the initial position it is elevated by the following mechanism: A lifting lever 64 (Figs. 2 and 11) is pivotally mounted on a bracket 65 depending from the top bar 15 and has a roller 66 in its outer end adapted to engage underneath the flange 40 of the pinion 39. The opposite end of this lifting lever is provided with a roller 67 which engages a segmental cam 68 on the cam wheel 69. This latter cam wheel is rotated by a longitudinal shaft 70 mounted in a journal 71 attached to one of the posts 17 and to a bracket journal 72 extending upwardly from the table 11 of the machine. A bevel gear 73 on the shaft 70 engages with the bevel gear 74 on the shaft 46 so that the shaft 70 is continuously driven through the medium of the electric motor 58. By lifting the pinion the pusher device is lifted over the pack of shiftable arms on its return motion from the final to the initial position.

Figure 8:
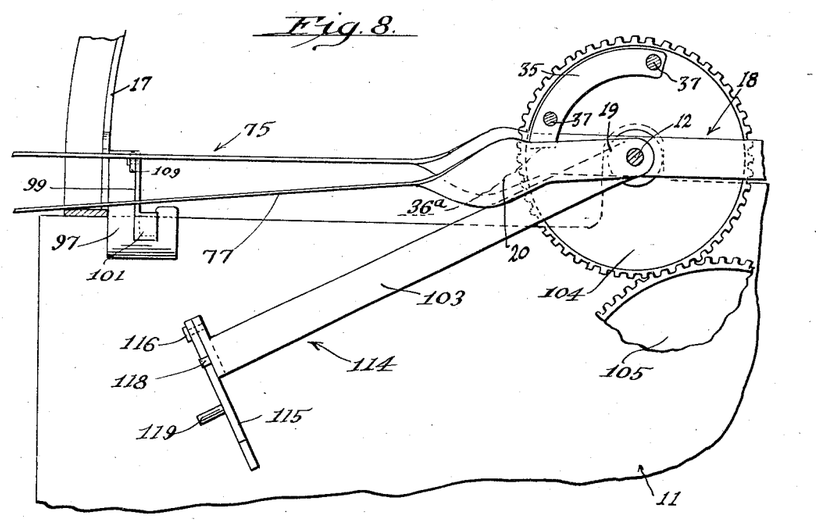
Fig. 8 is an enlarged plan showing a pair of card carrying arms and the shifting beam.

The pusher device 34 in carrying the arms from the initial to the final position, causes each arm to stop at the position indicated by the numeral 75 (Fig. 8), the notch 36 carrying each arm only this far. When a next succeeding arm is brought from the initial to the final position, the forward or leading edge 36^A of the pusher 35 engages the arm which formerly occupied the position indicated as 75 and thrusts this the complete distance as indicated at 77 (Fig. 8). As above mentioned, the last arm of the pack has a bracket 29 and on the supporting plate 33 of this bracket there is preferably a strip of leather 33^A which thrusts underneath the stack of arms and supports these in the position indicated in Fig. 13 at the final position, and transfers the pack so supported to the initial position in a manner hereunder set forth.

Figure 12:
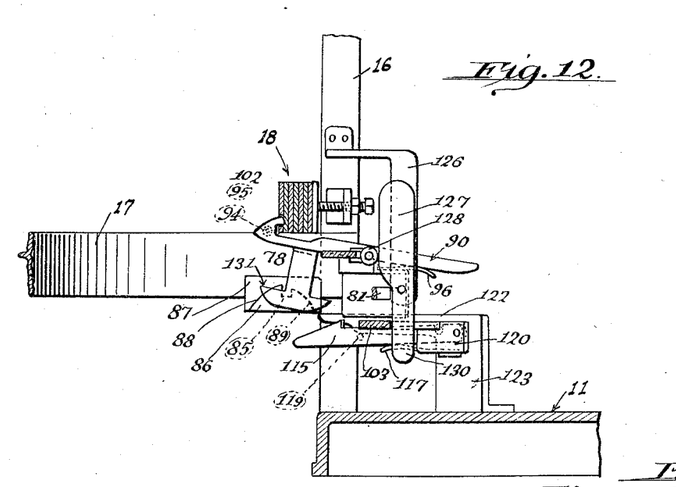
Fig. 12 is a view somewhat similar to Fig. 5, showing the shifting beams in another position.

The manner of transferring the pack of arms from the final to the initial position is accomplished by the following mechanism:

The latching beam 78 has a hub 79 with a perforation therethrough and pivots on the vertical shaft 12. This beam is supported by a collar 80 on the shaft. A trigger 81 is mounted on a pivot 82 carried by the beam 78. This trigger has a knob 83 on its innermost portion and an outer end 84 (Fig. 6) which is adapted to engage the notch 85 of a detent plate 86 carried by a bracket 87 mounted on the arcuate track (Fig. 12). The detent plate has a cam surface 88 at the front and a lower cam surface 89 on the back so that when the latching beam 78 is being moved from the final back to the initial position, the trigger jumps from the surface 88 to the surface 89 without falling into the notch 85. When this arm has a slight forward motion in the manner hereunder detailed, the trigger rides on the surface 89 and falls into the notch 85.

The latching beam 78 is moved from the initial to the final position after transference of the pack of arms by the pusher device; this dropping through the action of the lifting lever 64 (Fig. 11) and the underside of the arcuate bar 35 strikes the knob 83 on the trigger, causing the end 84 to pivot upwardly and release from the detent notch 85.

Figure 5:
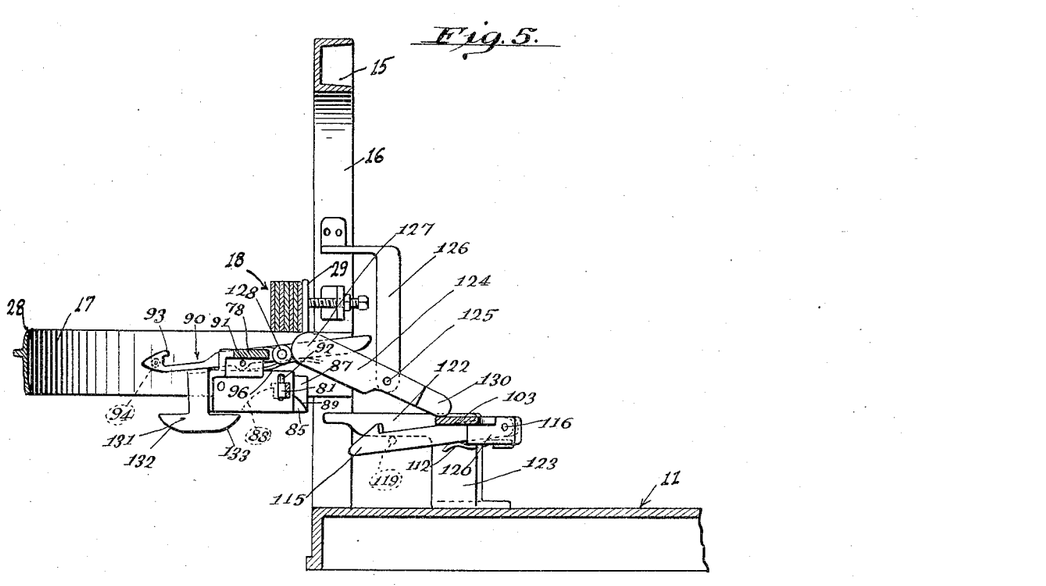
Fig. 5 is a partial elevational section taken somewhat on the line 5—5 of Fig. 1 in the direction of the arrows, showing details of the shifting beam.
Figure 7:
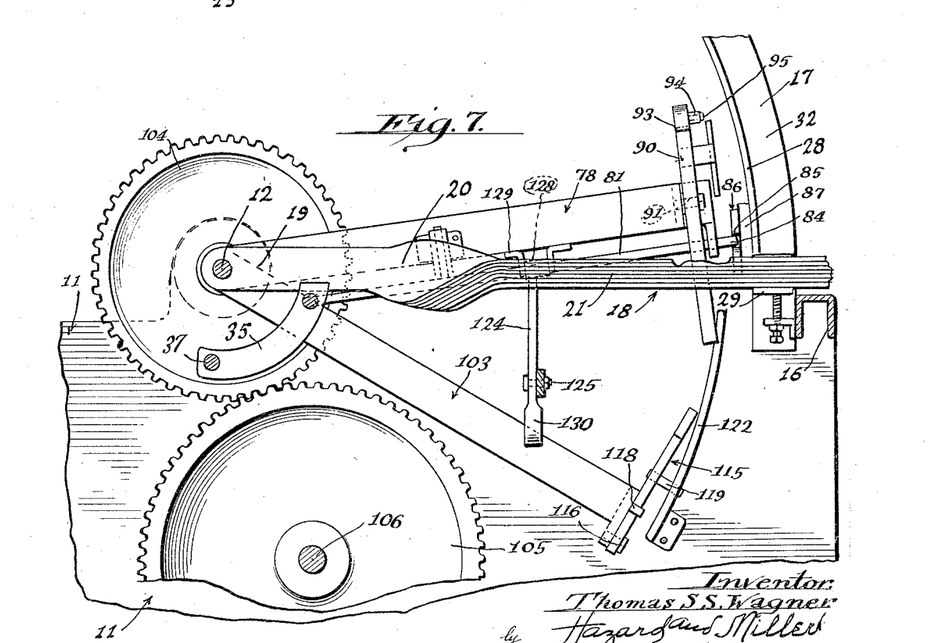
Fig. 7 is a horizontal section on the line 7—7 of Fig. 6 in the direction of the arrows.

The latching beam 78 carries a latch 90 mounted on a pintle 91 adjacent the outer end of the beam and above the slot 92 which forms a guide for the outer end 84 of the trigger 81 (note Figs. 5, 6 and 7). This latch has a hook 93 on its outer end and carries a small roller 94 mounted on a stud 95 on one side. A leaf spring 96 secured to the beam 78 is under tension to normally hold the latch in the position shown in Fig. 5. This causes the latch to freely pass underneath the pack of card carrying arms when the shifting beam 78 is moved from the initial to the final position. (Note Fig. 10).

At the final position there is a bracket 97 secured to the arcuate track and having an upwardly inclined fixed cam 98 on which the roller 94 rides. This roller when riding on the cam 98 engages underneath a tilting cam 99 mounted on a pivot 100 on the bracket 97. This tilting cam has a cam surface 101, which on the back motion of the latching beam in a manner to be hereunder set forth, causes the roller 94 to ride on the surface 101 so that the hook 93 engages in a socket 102 in the last arm of the pack of card carrying arms. (Note Figs. 10 and 12).

The mechanism for moving the latching beam with the pack of card carrying arms from the final to the initial position is as follows:

A shifting beam 103 is fixedly connected to a gear 104 mounted on the shaft 12 (Fig. 6). This gear 104 meshes with a gear 105 on a vertical shaft 106 having a bottom bearing 107 in the table 11 and a top bearing 108 supported on the cross bar 109 which is mounted on posts 110 extending upwardly from the table 11. A pinion 111 on the shaft 106 meshes with a second rack 112 on the rack bar 41. Therefore as this rack bar is reciprocated by the cam 59 in the manner set forth above, the shaft 106 is rotated in opposite directions, thereby causing a reverse movement of the gear 104 and an oscillating movement of the shifting beam 103, causing this beam to move from the initial to the final side of the machine having a greater movement than the card carrying arms. This shifting beam moves from substantially the position indicated at 113 in Fig. 1 on the initial side, to the position 114 on the final side as indicated in Fig. 8.

Figures 9, 10:
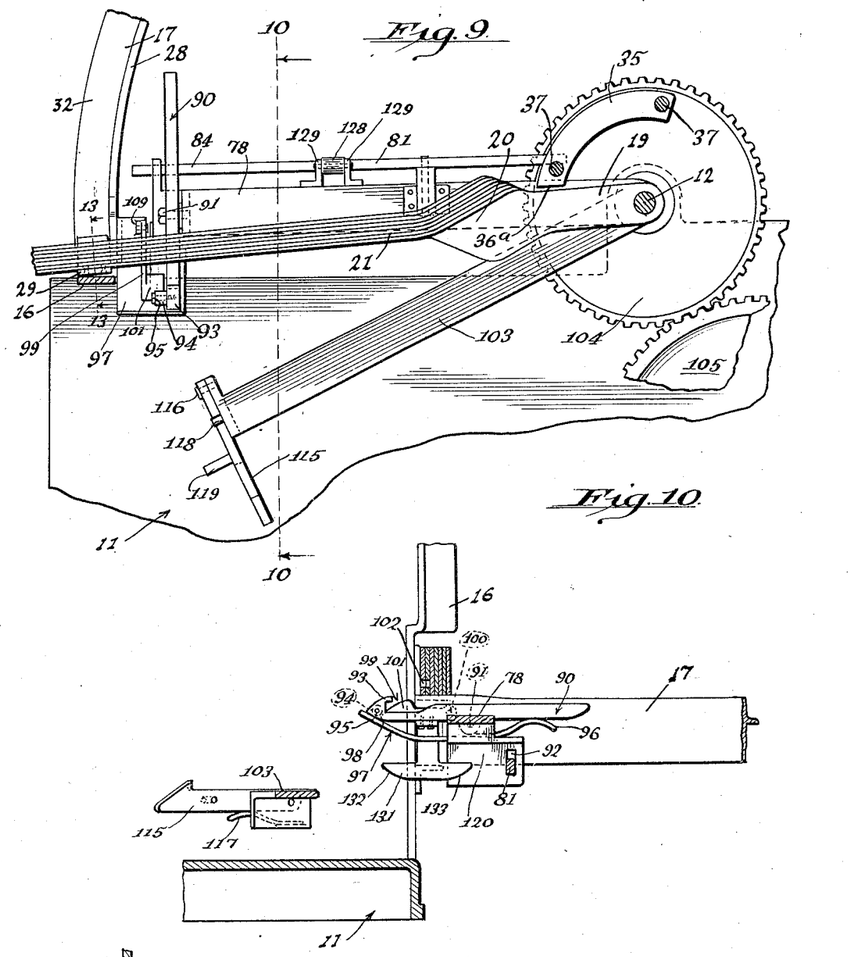
Fig. 9 is a view similar to Fig. 7, showing the card carrying arms in the final position.
Fig. 10 is a vertical section on the line 10—10 of Fig. 9 in the direction of the arrows.

The shifting beam has a latch 115 mounted on a pivot 116 on the end of the shifting beam 103. (Figs. 7, 8 and 10). A spring 117 secured to the end of the shifting beam normally tends to thrust the latch 115 upwardly. A stop pin 118 on the end of the shifting beam limits the upward movement of the latch and this latch is provided with a lateral pin 119. When the shifting beam is moved to the final side of the machine the latch 115 slides underneath the latching beam and on the return movement the latch being forced upwardly by the spring, engages the bracket 120 depending from the latching beam 78.

The first action of the return movement of the latching beam from the final to the initial side is to cause a movement of the latching beam from the position illustrated in Fig. 10 to engage the hook 93 of the latch 90 in the socket 102 of the pack of card carrying arms. The continued movement of the shifting beam carries the latching beam and the pack of arms with it as shown at 121 in Fig. 11, until the pack of card carrying arms is returned to the initial position.

At the initial position the pin 119 extending laterally from the latch 115, strikes a fixed cam 122 mounted on a bracket 123 supported from the table of the machine. This action causes a depression of the latch 115 carried by the shifting beam and the latch releases from the bracket 120 on the latching beam leaving this device in the position shown in Fig. 12. The continued movement of the shifting beam carries it from the position of Fig. 12 to the position of Fig. 5 and in so doing this beam rocks a pressing lever 124 mounted on a pivot 125 on a bracket 126 connected to the side post 16 of the machine at the initial position. The upper end 127 of the pressing lever bears against a roller 128 mounted in supports 129 on the rear edge of the latching beam 78. This thrusts the beam in a forward direction to the position shown in Fig. 5 so that the end 84 of the trigger 81 rides upwardly on the cam 89 and slips into the detent notch 85 (note Figs. 5 and 12). This holds the shifting beam stationary while the pusher device functions to shift all the card carrying arms from the initial to the final position. The pressing lever is provided with a counter-weight 130 to cause this normally to occupy a vertical position as shown in Fig. 12.

In order to allow the shifting beam to have its oscillating movement under the latching beam without engaging the bracket 120 at each return movement, the latch 90 on the latching beam is provided with a depending cam 131 (Fig. 5). This cam has a front surface 132 and a rear surface 133 and as above mentioned the spring operating on the latch 90 normally holds this latch and the cam depressed in the position shown in Fig. 5.

In the oscillating movement of the shifting beam 103 from the initial to the final position and back again, the pin 119 on the latch 115 rides on the surface 133 and 132 of the cam 131 depending from the latch 90 and as the spring 96 which holds this latch downwardly is stronger than the spring 117 which thrusts the latch 115 upwardly, this latch 115 is prevented from catching the abutment 120 depending from the latching beam 78 and hence does not disturb this beam and the shifting beam has a free oscillation until it is required to function to return the latching beam and the pack of card carrying arms from the final to the initial position.

Various changes may be made in the principles of my invention without departing from the spirit thereof as set forth in the description, drawings and claims.

I claim:

1. A display machine comprising in combination an arm adapted to support advertising matter, said arm being mounted on a pivot, an oscillating device engaging said arm in one direction of movement and shifting the arm from an initial to a final position, and a second oscillating device shiftable from the initial to the final position and in such position engaging the said arm, and a returning device to engage the second oscillating device to return the arm from the final to the initial position.

2. A display machine comprising in combination an arm adapted to support advertising matter and mounted for partial rotation on a pivot, an arm moving device rotatably mounted to engage the said arm and move it from an initial to a final position, a latching beam, means to move said beam from the initial to the final position, a latch on said beam to engage the arm, a shifting beam having a rotary movement and means on said beam to engage the latching beam and return the latching beam from the final to the initial position, the latching beam carrying the said arm.

3. A display machine comprising in combination an arm adapted to carry display matter mounted for oscillatory movement on a pintle at one end, a rotatable pusher device having means to engage the arm and move the arm from the initial to the final position, means to free the pusher device from the said arm, a latching beam engageable by the pusher device and shiftable from the initial to the final position, the pusher device being disengageable from the said beam, a latch on the said beam to engage the said arm, and means to return the latching beam with the arm from the final to the initial position.

4. A display machine as claimed in claim 3, the means for returning the beam comprising a shifting beam rotatably mounted on the pintle, a latch on the shifting beam engaging the latching beam and moving said beam with the arm to the initial position.

5. A display machine comprising in combination an arm adapted to carry display matter and mounted for oscillating movement on a pintle, at one end, a pusher device having a rotary movement on the said pintle, having means to engage the arm and move same from the initial to the final position, means to engage the pusher device to rotate said device, said device being returnable to the initial position, a latching beam engageable by the pusher device, said beam being rotatable on the said pintle and shiftable by the pusher device from the initial to the final position, a shifting beam rotatable on said pintle, a latch on the latching beam to engage the said arm and means on the shifting beam to engage the latching beam, the shifting beam returning the latching beam and the arm from the final to the initial position.

6. A display machine comprising in combination an arm adapted to carry advertising matter and being mounted for oscillatory movement on a pintle at one end, a pusher device having an oscillating movement on the said pintle and having means to engage the said arm and shift the arm from the initial to the final position, means to disengage the pusher device from the arm, a latching beam mounted on the said pintle and engageable by the pusher device to shift from the initial to the final position, a latch on the latching beam engaging the said arm, a shifting beam mounted on the said pintle and having an oscillatory movement, a latch on said shifting beam engaging the said latching beam and returning the latching beam and the arm from the final to the initial position, the said shifting beam having a more rapid movement in the return than the pusher device in its return movement.

7. A display machine comprising in combination a plurality of arms adapted to carry advertising matter, each mounted on a common pintle for rotatable movement, an arm moving device rotatable concentric to the pintle and engaging each arm in succession and moving the arms from the initial to the final position, the arm moving device becoming disengaged from each arm at the final position, and means to return the arms as a pack from the final to the initial position.

8. A display machine comprising in combination a plurality of arms adapted to carry display matter, each mounted on a common pintle at one end, said arms being adapted to be arranged in a pack, an oscillatory arm moving device adapted to engage each arm in succession and move it from the initial to the final position and to there disengage each arm, the arms being arranged in a pack at the final position, an oscillatory return movement device operating concentric to the said pintle and engaging the pack of arms at the final position and returning said arms to the initial position.

9. A display machine comprising in combination a plurality of arms adapted to carry display matter, each mounted on a common pintle at one end, each of the arms having a portion at right angles to the pintle, the arms fitting together in a pack, an arm moving device having rotary movement concentric to the said pintle and engaging each arm in succession by a movement longitudinally of the pintle and by a rotary movement shifting each arm in succession from the initial to the final position, the arms being arranged in a pack at the initial and final positions, the arm moving device being disengageable from each of the arms at the final position and a return mechanism having rotary movement concentric with the pintle and engaging the pack of arms at the final position returning said arms to the initial position.

10. A display machine as claimed in claim 9, the return mechanism comprising a latching beam rotating concentric to the pintle and shiftable by the arm moving device from the initial to the final position and there having a latching means to engage the pack of arms, and a shifting device rotatable concentric with the pintle to return the latching means and the pack of arms from the final to the initial position.

11. A display machine as claimed in claim 9, the return mechanism comprising a latching beam rotatable concentric to the pintle and shiftable by the arm moving device from the initial to the final position and there have a latch to engage the pack of arms, a shifting beam rotatable concentric to the pintle and at the final position having a latch to engage the latching beam and return said latching beam and the arms from the final to the initial position.

In testimony whereof I have signed my name to this specification.

THOMAS S. S. WAGNER.